United States Patent
Poteet (10) Patent No.: US 11,046,619 B2
(45) Date of Patent: Jun. 29, 2021

(54) HIGH TEMPERATURE OXIDATION PROTECTION FOR COMPOSITES

(71) Applicant: GOODRICH CORPORATION, Charlotte, NC (US)

(72) Inventor: Steven A. Poteet, Hamden, CT (US)

(73) Assignee: Goodrich Corporation, Charlotte, NC (US)

(*) Notice: Subject to any disclaimer, the term of this patent is extended or adjusted under 35 U.S.C. 154(b) by 198 days.

(21) Appl. No.: 16/102,100

(22) Filed: Aug. 13, 2018

(65) Prior Publication Data
US 2020/0048151 A1    Feb. 13, 2020

(51) Int. Cl.
| | | |
|---|---|---|
| B05D 1/28 | (2006.01) | |
| C04B 41/00 | (2006.01) | |
| C04B 41/45 | (2006.01) | |
| C23D 3/00 | (2006.01) | |
| C23D 5/02 | (2006.01) | |

(Continued)

(52) U.S. Cl.
CPC .......... *C04B 35/83* (2013.01); *C04B 41/5031* (2013.01); *C04B 41/5035* (2013.01); *C04B 41/5041* (2013.01); *C04B 41/5048* (2013.01); *C04B 41/5059* (2013.01); *C04B 41/5064* (2013.01); *C04B 41/5072* (2013.01); *F16D 65/125* (2013.01); *C04B 2235/386* (2013.01); *C04B 2235/9684* (2013.01); *C04B 2237/385* (2013.01); *C04B 2237/52* (2013.01)

(58) Field of Classification Search
CPC ....... C04B 35/83; C04B 41/009; C04B 41/52; C04B 41/86; C04B 41/89; C04B 41/5041; C04B 41/5022; C04B 41/5031; C04B 41/5034; C04B 41/5048; C04B 41/5059; C04B 41/5064; C04B 41/5072; C04B 2235/386; C04B 2235/9684; C04B 2237/385; C04B 2237/52; C04B 2111/00362; C04B 2111/00982; F16D 65/125; C03C 8/08; C03C 8/14; C03C 8/24; C03C 1/008; C03C 3/16

See application file for complete search history.

(56) References Cited

U.S. PATENT DOCUMENTS

| | | |
|---|---|---|
| 2,685,539 A | 8/1954 | Woodburn, Jr. et al. |
| 2,685,540 A | 8/1954 | Woodburn, Jr. et al. |

(Continued)

FOREIGN PATENT DOCUMENTS

| | | |
|---|---|---|
| CN | 1046517 | 10/1990 |
| CN | 102515850 | 6/2012 |

(Continued)

OTHER PUBLICATIONS

USPTO, Non-Final Office Action filed Jun. 7, 2019 in U.S. Appl. No. 15/174,537.

(Continued)

*Primary Examiner* — Alexander M Weddle
(74) *Attorney, Agent, or Firm* — Snell & Wilmer L.L.P.

(57) ABSTRACT

An oxidation protection system disposed on a substrate is provided, which may comprise a base layer comprising a first pre-slurry composition comprising a first phosphate glass composition, and/or a sealing layer comprising a second pre-slurry composition comprising a second phosphate glass composition and a strengthening compound comprising boron nitride, a metal oxide, and/or silicon carbide.

13 Claims, 6 Drawing Sheets

(51) Int. Cl.
    *C04B 35/83*     (2006.01)
    *C04B 41/50*     (2006.01)
    *F16D 65/12*     (2006.01)

(56) References Cited

U.S. PATENT DOCUMENTS

| | | |
|---|---|---|
| 2,685,541 A | 8/1954 | Woodburn, Jr. et al. |
| 2,685,542 A | 8/1954 | Woodburn, Jr. et al. |
| 2,989,153 A | 6/1961 | Boulet et al. |
| 3,342,627 A | 9/1967 | Paxton et al. |
| 3,510,347 A | 5/1970 | Strater |
| 3,692,150 A | 9/1972 | Ruppe, Jr. |
| 3,713,882 A | 1/1973 | DeBrunner et al. |
| 3,794,509 A | 2/1974 | Trauger et al. |
| 3,972,395 A | 8/1976 | Jannasch et al. |
| 4,290,510 A | 9/1981 | Warren |
| 4,330,572 A | 5/1982 | Frosch et al. |
| 4,332,856 A | 6/1982 | Hsu |
| 4,425,407 A | 1/1984 | Galasso et al. |
| 4,439,491 A | 3/1984 | Wilson |
| 4,454,193 A | 6/1984 | Block |
| 4,471,023 A | 9/1984 | Shuford |
| 4,500,602 A | 2/1985 | Patten et al. |
| 4,548,957 A | 10/1985 | Hucke |
| 4,567,103 A | 1/1986 | Sara |
| 4,617,232 A | 10/1986 | Chandler et al. |
| 4,621,017 A | 11/1986 | Chandler et al. |
| 4,663,060 A | 5/1987 | Holinski |
| 4,702,960 A | 10/1987 | Ogman |
| 4,711,666 A | 12/1987 | Chapman et al. |
| 4,726,995 A | 2/1988 | Chiu |
| 4,760,900 A | 8/1988 | Shima et al. |
| 4,837,073 A | 6/1989 | McAllister et al. |
| 4,863,001 A | 9/1989 | Edmisten |
| 4,892,790 A | 1/1990 | Gray |
| 4,958,998 A | 9/1990 | Yamauchi et al. |
| 5,073,454 A | 12/1991 | Graham |
| 5,077,130 A | 12/1991 | Okuyama et al. |
| 5,094,901 A | 3/1992 | Gray |
| 5,102,698 A | 4/1992 | Cavalier et al. |
| 5,153,070 A | 10/1992 | Andrus et al. |
| 5,198,152 A | 3/1993 | Liimatta et al. |
| 5,215,563 A | 6/1993 | LaCourse et al. |
| 5,224,572 A | 7/1993 | Smolen et al. |
| 5,242,746 A | 9/1993 | Bommier et al. |
| 5,256,448 A | 10/1993 | De Castro |
| 5,273,819 A | 12/1993 | Jex |
| 5,298,311 A | 3/1994 | Bentson et al. |
| 5,324,541 A | 6/1994 | Shuford |
| 5,352,494 A | 10/1994 | Rousseau |
| 5,360,638 A | 11/1994 | Lequertier |
| 5,401,440 A | 3/1995 | Stover et al. |
| 5,427,823 A | 6/1995 | Varshney et al. |
| 5,439,080 A | 8/1995 | Haneda et al. |
| 5,501,306 A | 3/1996 | Martino |
| 5,518,683 A | 5/1996 | Taylor et al. |
| 5,518,816 A | 5/1996 | Shuford |
| 5,536,574 A | 7/1996 | Carter |
| 5,622,751 A | 4/1997 | Thebault et al. |
| 5,629,101 A | 5/1997 | Watremez |
| 5,643,663 A | 7/1997 | Bommier et al. |
| 5,682,596 A | 10/1997 | Taylor et al. |
| 5,686,144 A | 11/1997 | Thebault et al. |
| 5,714,244 A | 2/1998 | Delaval et al. |
| 5,725,955 A | 3/1998 | Tawil et al. |
| 5,759,622 A | 6/1998 | Stover |
| 5,871,820 A | 2/1999 | Hasz et al. |
| 5,878,843 A | 3/1999 | Saum |
| 5,878,849 A | 3/1999 | Prunier, Jr. et al. |
| 5,901,818 A | 5/1999 | Martino |
| 5,958,846 A | 9/1999 | Geriner |
| 5,971,113 A | 10/1999 | Kesavan et al. |
| 5,981,072 A | 11/1999 | Mercuri et al. |
| 6,016,450 A | 1/2000 | Corck |
| 6,036,762 A | 3/2000 | Sambasivan |
| 6,071,603 A | 6/2000 | Sakai et al. |
| 6,331,362 B1 | 12/2001 | Dupel et al. |
| 6,346,331 B2 | 2/2002 | Harvey et al. |
| 6,460,374 B2 | 10/2002 | Sakai et al. |
| 6,461,415 B1 | 10/2002 | Sambasivan et al. |
| 6,497,307 B1 | 12/2002 | Schoo et al. |
| 6,551,701 B1 | 4/2003 | Nohr et al. |
| 6,551,709 B1 | 4/2003 | Stover |
| 6,555,173 B1 | 4/2003 | Forsythe et al. |
| 6,668,984 B2 | 12/2003 | Gray |
| 6,737,120 B1 | 5/2004 | Golecki |
| 6,884,467 B2 | 4/2005 | Walker et al. |
| 6,896,968 B2 | 5/2005 | Golecki |
| 6,913,821 B2 | 7/2005 | Golecki et al. |
| 6,969,422 B2 | 11/2005 | Mazany et al. |
| 7,011,888 B2 | 3/2006 | Bauer et al. |
| 7,118,805 B2 | 10/2006 | Walker et al. |
| 7,311,944 B2 | 12/2007 | Sambasivan et al. |
| 7,501,181 B2 | 3/2009 | Walker et al. |
| 7,641,941 B2 | 1/2010 | Mazany et al. |
| 7,732,358 B2 | 6/2010 | Mazany et al. |
| 7,785,712 B2 | 8/2010 | Miller et al. |
| 7,938,877 B2 | 5/2011 | Liu et al. |
| 7,968,192 B2 | 6/2011 | Manzany et al. |
| 8,021,474 B2 | 9/2011 | Mazany et al. |
| 8,021,758 B2 | 9/2011 | Sambasivan et al. |
| 8,124,184 B2 | 2/2012 | Sambasivan et al. |
| 8,322,754 B2 | 12/2012 | Carcagno et al. |
| 8,962,083 B2 | 2/2015 | Murphy |
| 9,126,873 B2 | 9/2015 | Diss et al. |
| 9,758,678 B2 | 9/2017 | Nicolaus et al. |
| 9,790,133 B2 | 10/2017 | Mazany |
| 10,526,253 B2 | 1/2020 | Poteet |
| 2002/0058576 A1 | 5/2002 | Mazany et al. |
| 2002/0096407 A1 | 7/2002 | Gray |
| 2002/0123592 A1 | 9/2002 | Zhang |
| 2003/0143436 A1 | 7/2003 | Forsythe et al. |
| 2004/0038032 A1* | 2/2004 | Walker ................ C04B 41/89 |
| | | 428/408 |
| 2004/0038043 A1 | 2/2004 | Golecki |
| 2004/0213906 A1 | 10/2004 | Mazany et al. |
| 2005/0022698 A1 | 2/2005 | Mazany et al. |
| 2006/0159909 A1 | 7/2006 | Asian |
| 2007/0154712 A1 | 7/2007 | Mazany et al. |
| 2008/0142148 A1 | 6/2008 | Mazany |
| 2008/0311301 A1 | 12/2008 | Diss et al. |
| 2010/0266770 A1 | 10/2010 | Mazany et al. |
| 2011/0311804 A1 | 12/2011 | Diss |
| 2013/0022826 A1 | 1/2013 | Kmetz |
| 2014/0196502 A1 | 7/2014 | Masuda |
| 2014/0227511 A1 | 8/2014 | Mazany |
| 2014/0349016 A1 | 11/2014 | Don |
| 2015/0183998 A1 | 7/2015 | Belov et al. |
| 2015/0291805 A1 | 10/2015 | Nicolaus et al. |
| 2015/0362029 A1 | 12/2015 | Edwards et al. |
| 2016/0122231 A1 | 5/2016 | Ishihara |
| 2016/0280585 A1* | 9/2016 | Mazany ................ C23D 3/00 |
| 2016/0280612 A1 | 9/2016 | Mazany |
| 2017/0036945 A1 | 2/2017 | Ishihara |
| 2017/0267595 A1 | 9/2017 | Mazany |
| 2017/0342555 A1 | 11/2017 | Mazany |
| 2017/0349825 A1 | 12/2017 | Mazany |
| 2017/0369713 A1 | 12/2017 | Poteet |
| 2017/0369714 A1 | 12/2017 | Nicolaus et al. |

FOREIGN PATENT DOCUMENTS

| | | |
|---|---|---|
| CN | 101712563 | 9/2012 |
| CN | 103274760 | 9/2013 |
| CN | 105237039 | 1/2016 |
| CN | 107935634 | 4/2018 |
| EP | 200568 | 11/1986 |
| EP | 0677499 | 10/1995 |
| EP | 1043290 | 10/2000 |
| EP | 1693262 | 8/2006 |
| EP | 1834937 | 9/2007 |
| EP | 1968914 | 7/2010 |
| EP | 2684752 | 1/2014 |
| EP | 2767529 | 8/2014 |

(56) References Cited

FOREIGN PATENT DOCUMENTS

| | | |
|---|---|---|
| EP | 2774900 | 9/2014 |
| EP | 2930162 | 10/2015 |
| EP | 3072865 | 9/2016 |
| EP | 3072866 | 9/2016 |
| EP | 3222602 | 9/2017 |
| EP | 3255027 | 12/2017 |
| EP | 3282038 | 2/2018 |
| EP | 3530637 | 8/2019 |
| GB | 2468378 | 9/2010 |
| JP | 09301786 | 11/1997 |
| JP | 2006036551 | 2/2006 |
| KR | 20050022947 | 3/2005 |
| WO | WO 9742135 | 11/1997 |
| WO | WO 0051950 | 9/2000 |
| WO | 03084899 | 10/2003 |
| WO | WO 2007078419 | 7/2007 |
| WO | WO 2014035413 | 3/2014 |
| WO | WO 2015169024 | 11/2015 |

OTHER PUBLICATIONS

USPTO, Notice of Allowance dated Jun. 17, 2019 in U.S. Appl. No. 15/169,257.
European Patent Office, European Office Action date Jun. 21, 2019 in Application No. 19155021.9.
USPTO, Notice of Allowance filed Jun. 26, 2019 in U.S. Appl. No. 15/169,219.
USPTO, Pre-Interview First Office Action dated Jul. 26, 2019 in U.S. Appl. No. 15/380,442.
USPTO, Notice of Allowance dated Aug. 13, 2019 in U.S. Appl. No. 15/194,034.
USPTO, Notice of Allowance filed May 1, 2020 in U.S. Appl. No. 15/234,903.
USPTO, Corrected Notice of Allowance filed Jul. 9, 2020 in U.S. Appl. No. 15/234,903.
USPTO, Corrected Notice of Allowance filed Aug. 7, 2020 in U.S. Appl. No. 15/234,903.
European Patent Office, European Search Report dated Aug. 28, 2019 in Application No. 17173707.5.
USPTO, Final Office Action filed Aug. 30, 2019 in U.S. Appl. No. 15/234,903.
The National Academics Press, Committee on Advanced Fibers for High-Temperature Ceramic Composites, Ceramic Fibers and Coatings: Advanced Materials for the Twenty-First Century, Chapter 6: Interfacial Coatings, (1998), p. 1-48 (Year: 1998).
USPTO, Notice of Allowance dated Sep. 25, 2019 in U.S. Appl. No. 15/380,442.
USPTO, Supplemental Notice of Allowance filed Oct. 2, 2019 in U.S. Appl. No. 15/169,219.
Steven A. Poteet, U.S. Appl. No. 16/666,809, filed Oct. 29, 2019 titled "High Temperature Oxidation Protection for Composites ," 45 pages.
USPTO, Advisory Action filed Nov. 20, 2019 in U.S. Appl. No. 15/234,903.
USPTO, Final Office Action dated Sep. 9, 2020 in U.S. Appl. No. 15/886,671.
USPTO, Non-Final Office Action dated Oct. 29, 2020 in U.S. Appl. No. 16/666,809.
USPTO, Pre-Interview First Office Action dated Apr. 17, 2020 in U.S. Appl. No. 15/886,671.
USPTO, Restriction/Election Requirement dated Apr. 30, 2020 in U.S. Appl. No. 16/029,134.
USPTO, Corrected Notice of Allowance dated May 28, 2020 in U.S. Appl. No. 16/116,665.
USPTO, First Action Interview Office Action dated Jun. 4, 2020 in U.S. Appl. No. 15/886,671.
USPTO, Final Office Action dated Oct. 26, 2018 in U.S. Appl. No. 15/234,903.
USPTO, Final Office Action dated Nov. 5, 2018 in U.S. Appl. No. 15/076,348.

Steven A. Poteet, U.S. Appl. No. 16/190,817, filed Nov. 14, 2018 titled "High Temperature Oxidation Protection for Composites ," 38 pages.
European Patent Office, European Office Action date Jul. 16, 2018 in Application No. 17174481.6.
USPTO, Notice of Allowance dated Aug. 24, 2018 in U.S. Appl. No. 14/671,637.
Anthony Mazany, U.S. Appl. No. 16/116,665, filed Aug. 29, 2018 titled "Formulations for Oxidation Protection of Composite Articles", 30 pages.
USPTO, Restriction/Election Requirement dated Aug. 30, 2018 in U.S. Appl. No. 15/169,219.
USPTO, Restriction/Election Requirement dated Aug. 30, 2018 in U.S. Appl. No. 15/169,257.
European Patent Office, European Search Report dated Nov. 25, 2019 in Application No. 19184523.9.
USPTO, Restriction/Election Requirement dated Dec. 13, 2019 in U.S. Appl. No. 15/886,671.
European Patent Office, European Search Report dated Dec. 13, 2019 in Application No. 19191306.0.
USPTO, Final Office Action filed Feb. 14, 2019 in U.S. Appl. No. 15/174,537.
USPTO, Non-Final Office Action filed Feb. 25, 2019 in U.S. Appl. No. 15/234,903.
USPTO, Notice of Allowance dated Feb. 21, 2020 in U.S. Appl. No. 16/116,665.
European Patent Office, European Search Report dated Mar. 23, 2020 in Application No. 19207148.8.
USPTO, Notice of Allowance dated Apr. 3, 2019 in U.S. Appl. No. 15/169,257.
USPTO, Restriction/Election Requirement dated Apr. 5, 2019 in U.S. Appl. No. 15/380,442.
USPTO, Non-Final Office Action dated Apr. 16, 2019 in U.S. Appl. No. 15/076,348.
USPTO, Final Office Action dated May 15, 2019 in U.S. Appl. No. 15/194,034.
USPTO, Advisory Action dated May 17, 2019 in U.S. Appl. No. 15/174,537.
USPTO, Non-Final Office Action filed Dec. 19, 2018 in U.S. Appl. No. 15/169,219.
USPTO, Non-Final Office Action filed Dec. 19, 2018 in U.S. Appl. No. 15/169,257.
USPTO, Non-Final Office Action filed Dec. 21, 2018 in U.S. Appl. No. 15/194,034.
USPTO, Advisory Action filed Dec. 28, 2018 in U.S. Appl. No. 15/076,348.
USPTO, Advisory Action filed Jan. 17, 2019 in U.S. Appl. No. 15/234,903.
International Search Report and Written Opinion dated Apr. 20, 2005 in Application No. PCT/US2004/012222.
International Preliminary Report on Patentability dated Aug. 18, 2005 in Application No. PCT/US2004/012222.
International Search Report and Written Opinion dated Jul. 3, 2007 in Application No. PCT/US2006/043343.
Office Action dated Jan. 4, 2008 in Application No. 04816727.4.
Office Action dated Feb. 26, 2008 in U.S. Appl. No. 10/829,144.
International Preliminary Report on Patentability dated Mar. 12, 2008 in Application No. PCT/US2006/043343.
Final Office Action dated Jul. 16, 2008 in U.S. Appl. No. 10/829,144.
Office Action dated Oct. 24, 2008 in U.S. Appl. No. 10/829,144.
Communication Pursuant to Article 94(3) EPC dated Oct. 28, 2008 in European Application No. 06837063.4.
Restriction Requirement dated Feb. 5, 2009 in U.S. Appl. No. 11/315,592.
Final Office Action dated Jan. 29, 2009 in U.S. Appl. No. 10/829,144.
Communication Pursuant to Article 94(3) EPC dated Feb. 9, 2009 in European Application No. 06837063.4.
Office Action dated May 29, 2009 in U.S. Appl. No. 10/829,144.
Office Action dated Jun. 9, 2009 in U.S. Appl. No. 11/315,592.
Notice of Allowance dated Oct. 1, 2009 in U.S. Appl. No. 10/829,144.
Final Office Action dated Dec. 11, 2009 in U.S. Appl. No. 11/315,592.
Communication under Rule 71(3) EPC dated Feb. 4, 2010 in European Application No. 06837063.4.

(56) References Cited

OTHER PUBLICATIONS

Advisory Action dated Feb. 25, 2010 in U.S. Appl. No. 11/315,592.
Office Action dated Apr. 1, 2010 in U.S. Appl. No. 11/315,592.
Partial European Search Report dated Oct. 29, 2010 in European Application No. 10169627.6.
Office Action dated Feb. 4, 2011 in U.S. Appl. No. 12/619,061.
Office Action dated Feb. 22, 2011 in U.S. Appl. No. 12/829,178.
Extended European Search Report dated May 4, 2011 in European Application No. 10169627.6.
Final Office Action dated Aug. 19, 2011 in U.S. Appl. No. 12/829,178.
Advisory Action dated Oct. 27, 2011 in U.S. Appl. No. 12/829,178.
U.S. Appl. No. 15/076,348, filed Mar. 21, 2016 titled "High Temperature Oxidation Protection for Composites," 42 pages.
U.S. Appl. No. 15/169,219, filed May 31, 2016 titled "High Temperature Oxidation Protection for Composites," 37 pages.
U.S. Appl. No. 15/169,257, filed May 31, 2016 titled "High Temperature Oxidation Protection for Composites," 40 pages.
U.S. Appl. No. 15/174,537, filed Jun. 6, 2016 titled "Nanocomposite Coatings for Oxidation Protection for Composites," 44 pages.
U.S. Appl. No. 15/194,034, filed Jun. 27, 2016 titled "High Temperature Oxidation Protection for Composites," 49 pages.
U.S. Appl. No. 15/234,903, filed Aug. 11, 2016 titled "High Temperature Oxidation Protection for Composites," 41 pages.
U.S. Appl. No. 15/380,442, filed Dec. 15, 2016 titled "High Temperature Oxidation Protection for Composites," 41 pages.
Extended European Search Report dated Jul. 26, 2016 in European Application No. 16161832.7.
Restriction Requirement dated Nov. 7, 2016 in U.S. Appl. No. 14/671,637.
Preinterview First Office Action dated Mar. 6, 2017 in U.S. Appl. No. 14/671,637.
First Action Interview Office Action dated May 12, 2017 in U.S. Appl. No. 14/671,637.
Restriction Requirement dated Jan. 5, 2018 in U.S. Appl. No. 15/076,348.
Extended European Search Report dated Aug. 2, 2017 in European Application No. 17159538.2.
Rovner; "A Haven for Glass, Ceramics"; Science & Technology; May 24, 2004; pp. 33-39.
Air Products and Chemicals, Inc., "Complete Product Offering," 4 pages, retrieved from www.airproducts.com on Jun. 28, 2004.
McKee, Chemistry and Physics of Carbon, vol. 16, P.L. Walker and P.A. Thrower eds., Marcel Dekker, 1981, p. 30-42.
Sosman, "The Common Refractory Oxides," The Journal of Industrial and Engineering Chemistry, vol. 8, No. 11, Nov. 1916, pp. 985-990.
Almatis Website, C-333, Accessed Feb. 8, 2011, p. 1.
Montedo et al., Crystallisation Kinetics of a B-Spodumene-Based Glass Ceramic, Advances in Materials Science and Engineering, pp. 1-9, vol. 2012, Article ID 525428, Hindawi Publishing Corporation.
Extended European Search Report dated Oct. 9, 2017 in European Application No. 17173709.1.
Extended European Search Report dated Oct. 17, 2017 in European Application No. 17173707.5.
Sun Lee W et al., "Comparative study of thermally conductive fillers in underfill for the electronic components", Diamond and Related Materials, Elsevier Science Publishers, Amsterdam, NL, vol. 14, No. 10, Oct. 1, 2005 (Oct. 1, 2005), pp. 1647-1653.
Rockwood Lithium, Spodumene Concentrate SC 7.5 premium, Aug. 2015, pp. 1-2, The Lithium Company.
D.D.L. Chung: "Acid Aluminum Phosphate for the Binding and Coating of Materials", Journal of Materials Science, vol. 38, No. 13, 2003, pp. 2785-2791.
Extended European Search Report dated Nov. 6, 2017 in European Application No. 17174481.6.
Final Office Action dated Jan. 17, 2018 in U.S. Appl. No. 14/671,637.
Communication Pursuant to Article 94(3) dated Jan. 13, 2018 in European Application No. 16161832.7.
Extended European Search Report dated Nov. 20, 2017 in European Application No. 17175809.7.
Extended European Search Report dated Nov. 20, 2017 in European Application No. 17178011.7.
Partial European Search Report dated Jan. 13, 2018 in European Application No. 17183478.1.
Advisory Action dated Mar. 30, 2018 in U.S. Appl. No. 14/671,637.
Non Final Office Action dated May 1, 2018 in U.S. Appl. No. 15/076,348.
Restriction/Election Requirement dated May 24, 2018 in U.S. Appl. No. 15/174,537.
Non Final Office Action dated Mar. 28, 2018 in U.S. Appl. No. 15/234,903.
European Search Report dated Apr. 11, 2018 in European Application no. 17183478.1-1103.
European Search Report dated Apr. 13, 2018 in European Application No. 17207767.9-1106.
U.S. Appl. No. 15/886,671, filed Feb. 1, 2018 titled "High Temperature Oxidation Protection for Composites," 45 pages.
USPTO, Supplemental Notice of Allowance dated Feb. 9, 2021 in U.S. Appl. No. 16/589,368.
USPTO, Supplemental Notice of Allowance dated Feb. 9, 2021 in U.S. Appl. No. 16/453,593.
USPTO, Final Office Action dated Feb. 2, 2021 in U.S. Appl. No. 16/666,809.
European Patent Office, European Search Report dated Nov. 19, 2020 in Application No. 17178011.7.
European Patent Office, European Office Action dated Oct. 22, 2020 in Application No. 17173709.1.
USPTO, Advisory Action dated Nov. 17, 2020 in U.S. Appl. No. 15/886,671.
USPTO, Notice of Allowance dated Dec. 7, 2020 in U.S. Appl. No. 16/589,368.
USPTO, Notice of Allowance dated Jan. 1, 2021 in U.S. Appl. No. 16/453,593.
USPTO, Supplemental Notice of Allowance dated Mar. 2, 2021 in U.S. Appl. No. 16/453,593.
USPTO, Decision on Appeal dated Apr. 5, 2021 in U.S. Appl. No. 15/076,348.
USPTO, Advisory Action dated Apr. 7, 2021 in U.S. Appl. No. 16/666,809.
USPTO, Notice of Allowance dated Apr. 15, 2021 in U.S. Appl. No. 16/668,852.

\* cited by examiner

HIGH TEMPERATURE OXIDATION PROTECTION FOR COMPOSITES

FIELD

The present disclosure relates generally to composites and, more specifically, to oxidation protection systems for carbon-carbon composite structures.

BACKGROUND

Oxidation protection systems for carbon-carbon composites are typically designed to minimize loss of carbon material due to oxidation at operating conditions, which include temperatures of 900° C. (1652° F.) or higher. Phosphate-based oxidation protection systems may reduce infiltration of oxygen and oxidation catalysts into the composite structure. However, despite the use of such oxidation protection systems, significant oxidation of the carbon-carbon composites may still occur during operation of components such as, for example, aircraft braking systems. In addition, at such high operating temperatures, phosphate-based oxidation protection systems (OPS) applied to non-wear surfaces of brake disks may experience decreasing viscosity, which may cause the OPS to migrate away from non-wear surface edges proximate to a wear surface of the brake disk, leaving the composite material at or proximate to the non-wear surface edges vulnerable to oxidation. Even further, at the high operating temperatures, components in the OPS may oxidize, and in some cases, evaporate from the OPS, lessening the oxidation protection capabilities.

SUMMARY

A method for forming an oxidation protection system on a composite structure is provided. In various embodiments, the method may comprise forming a first slurry by combining a first pre-slurry composition with a first carrier fluid, wherein the first pre-slurry composition comprises a first phosphate glass composition; applying the first slurry to the composite structure; heating the composite structure to a temperature sufficient to form a base layer on the composite structure; forming a second slurry by combining a second pre-slurry composition with a second carrier fluid, wherein the second pre-slurry composition comprises a second phosphate glass composition and a strengthening compound comprising at least one of boron nitride, a metal oxide, or silicon carbide; applying the second slurry to the composite structure; and/or heating the composite structure to a temperature sufficient to form a sealing layer on the composite structure. In various embodiments, the strengthening compound may comprise boron nitride. In various embodiments, the metal oxide may comprise at least one of aluminum oxide, silicon dioxide, and titanium oxide.

In various embodiments, the second slurry may comprise between 0.1 and 6 weight percent boron nitride. In various embodiments, the second slurry may comprise between 2 and 5 weight percent boron nitride. In various embodiments, the second phosphate glass composition may comprise a glass frit, and wherein a weight ratio of boron nitride to the glass frit in the second slurry may be between 5:100 to 15:100. In various embodiments, the second phosphate glass composition may comprise a glass frit, and wherein a weight ratio of boron nitride to the glass frit in the second slurry may be between 10:100 to 12:100.

In various embodiments, the first pre-slurry composition may further comprise a silica compound comprising at least one of silica and a silica former. In various embodiments, the silica former may comprise at least one of a metal silicide, silicon, fumed silica, silicon carbide, and silicon carbonitride. In various embodiments, the first pre-slurry composition of the base layer may comprise between about 15 weight percent and about 30 weight percent boron nitride. In various embodiments, the first pre-slurry composition may comprise a first acid aluminum phosphate wherein a first molar ratio of aluminum to phosphate may be between 1 to 2 and 1 to 3.

In various embodiments, the method may further comprise applying a pretreating composition, wherein the applying comprises applying a first pretreating composition to an outer surface of the composite structure before the applying the first slurry, wherein the first pretreating composition comprises aluminum oxide and water; heating the pretreating composition; and/or applying a second pretreating composition comprising at least one of a phosphoric acid or an acid phosphate salt, and an aluminum salt on the first pretreating composition, wherein the composite structure is porous and the second pretreating composition penetrates at least a portion of a plurality of pores of the composite structure.

In various embodiments, at least one of the first phosphate glass composition or the second phosphate glass composition may be represented by the formula $$a(A'_2O)_x(P_2O_5)_{y_1}b(G_fO)_{y_2}c(A''O)_z;$$

A' is selected from: lithium, sodium, potassium, rubidium, cesium, and mixtures thereof;

$G_f$ is selected from: boron, silicon, sulfur, germanium, arsenic, antimony, and mixtures thereof;

A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof;

a is a number in the range from 1 to about 5;
b is a number in the range from 0 to about 10;
c is a number in the range from 0 to about 30;
x is a number in the range from about 0.050 to about 0.500;
$y_1$ is a number in the range from about 0.100 to about 0.950;
$y_2$ is a number in the range from 0 to about 0.20; and
z is a number in the range from about 0.01 to about 0.5;

$$(x+y_1+y_2+z)=1;\text{ and}$$

$$x<(y_1+y_2).$$

In various embodiments, an oxidation protection system disposed on an outer surface of a substrate may comprise a base layer comprising a first pre-slurry composition comprising a first phosphate glass composition; and/or a sealing layer comprising a second pre-slurry composition comprising a second phosphate glass composition and a strengthening compound comprising at least one of boron nitride, a metal oxide, or silicon carbide. The sealing layer may be disposed on the base layer. In various embodiments, the strengthening compound may comprise boron nitride. In various embodiments, the second phosphate glass composition may comprise a glass frit, and wherein a weight ratio of boron nitride to the glass frit in the sealing layer may be between 5:100 to 15:100. In various embodiments, the base layer may further comprise a silicon compound comprising at least one of silica and a silica former. In various embodiments, the silica former may be at least one of a metal silicide, silicon, fumed silica, silicon carbide, and silicon carbonitride.

In various embodiments, at least one of the first phosphate glass composition and the second phosphate glass composition is represented by the formula $a(A'_2O)_x(P_2O_5)_{y_1}b(G_fO)_{y_2}c(A''O)_z$:

A' is selected from: lithium, sodium, potassium, rubidium, cesium, and mixtures thereof;

$G_f$ is selected from: boron, silicon, sulfur, germanium, arsenic, antimony, and mixtures thereof;

A'' is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof;

a is a number in the range from 1 to about 5;
b is a number in the range from 0 to about 10;
c is a number in the range from 0 to about 30;
x is a number in the range from about 0.050 to about 0.500;
$y_1$ is a number in the range from about 0.100 to about 0.950;
$y_2$ is a number in the range from 0 to about 0.20; and
z is a number in the range from about 0.01 to about 0.5;

$(x+y_1+y_2+z)=1$; and $x<(y_1+y_2)$.

In various embodiments, an aircraft brake disk may comprise a carbon-carbon composite structure comprising a non-wear surface; and/or an oxidation protection system disposed on the non-wear surface. The oxidation protection system may comprise a base layer comprising a first pre-slurry composition disposed on the non-wear surface, wherein the first pre-slurry composition comprises a first phosphate glass composition; and/or a sealing layer comprising a second pre-slurry composition comprising a second phosphate glass composition and boron nitride disposed on the base layer, wherein the sealing layer comprises between 5 and 15 percent weight boron nitride.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1A:
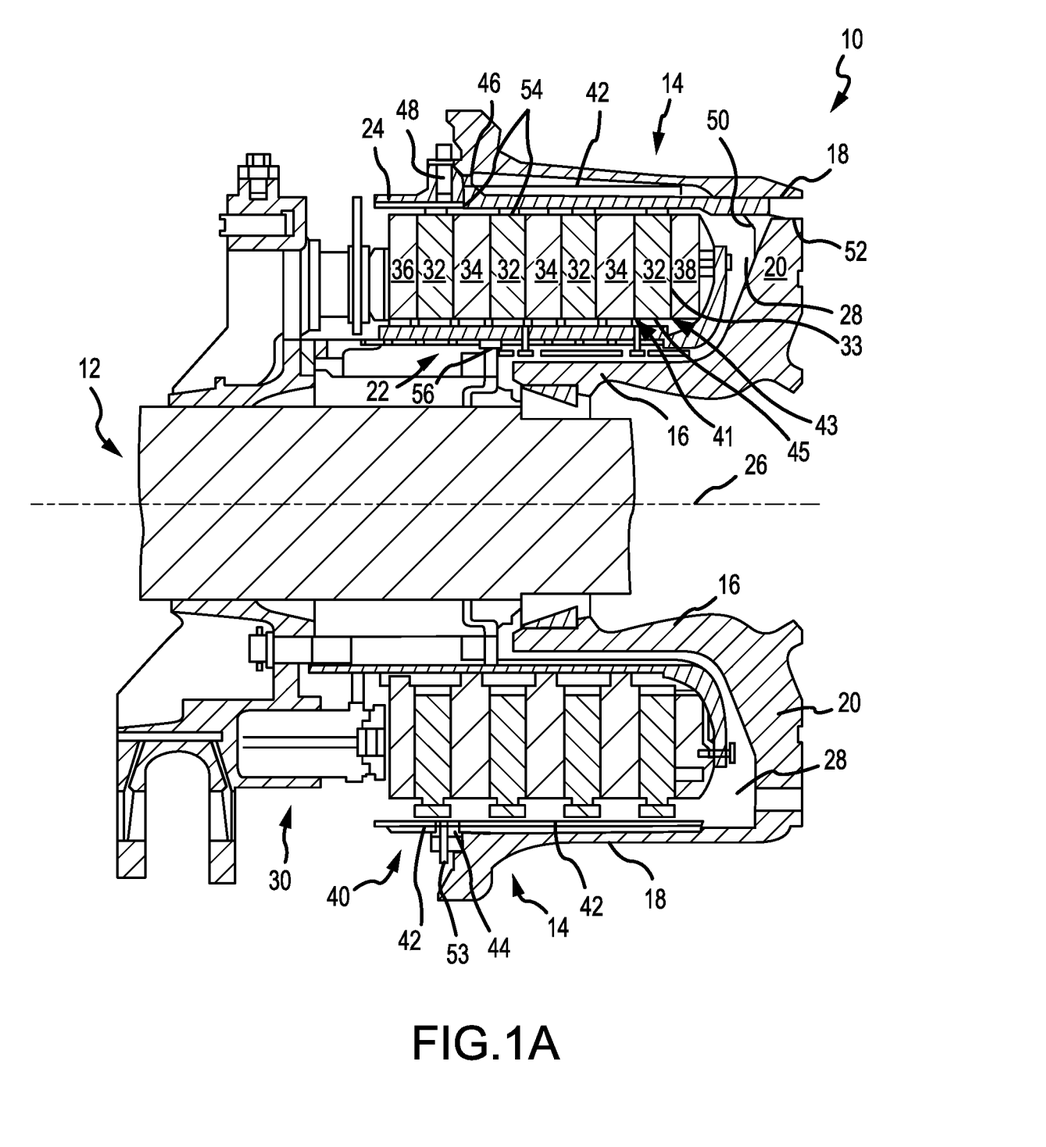
FIG. 1A illustrates a cross sectional view of an aircraft wheel braking assembly, in accordance with various embodiments.
Figure 1B:
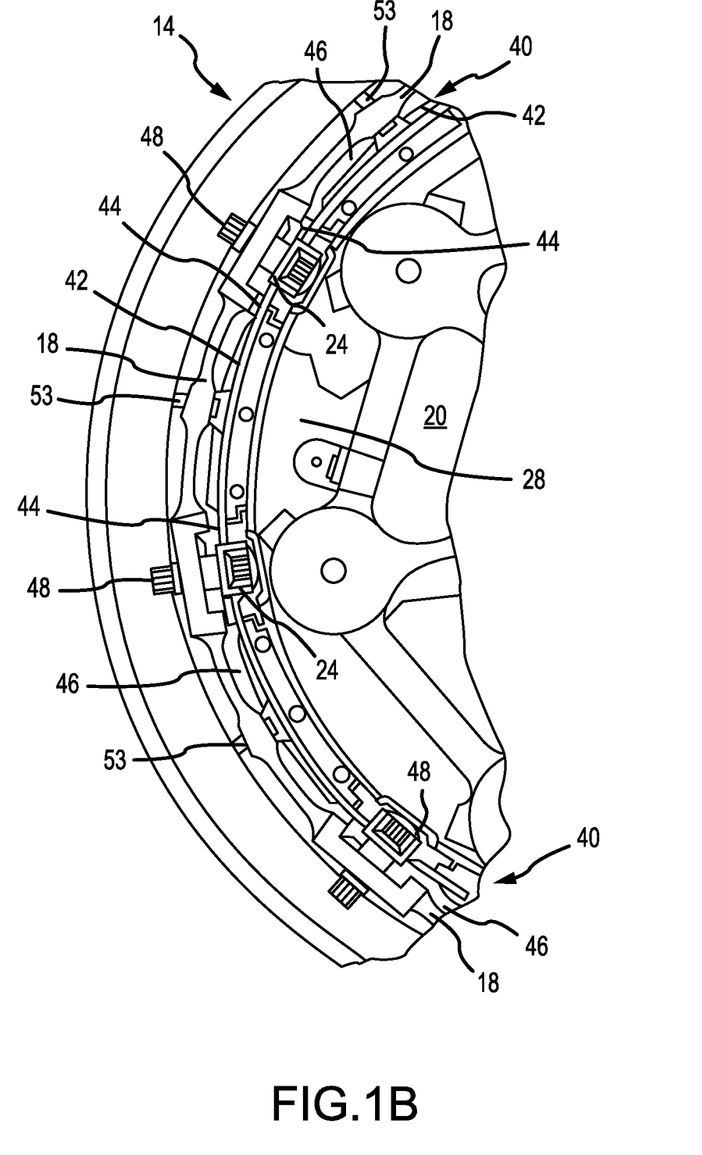
FIG. 1B illustrates a partial side view of an aircraft wheel braking assembly, in accordance with various embodiments.

With initial reference to FIGS. 1A and 1B, aircraft wheel braking assembly 10 such as may be found on an aircraft, in accordance with various embodiments is illustrated. Aircraft wheel braking assembly may, for example, comprise a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield segments 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56. FIG. 1B illustrates a portion of aircraft wheel braking assembly 10 as viewed into wheel well 18 and wheel well recess 28.

In various embodiments, the various components of aircraft wheel braking assembly 10 may be subjected to the application of compositions and methods for protecting the components from oxidation.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

Carbon-carbon composites (also referred to herein as composite structures, composite substrates, and carbon-carbon composite structures, interchangeably) in the friction disks may operate as a heat sink to absorb large amounts of kinetic energy converted to heat during slowing of the aircraft. Heat shield 40 may reflect thermal energy away from wheel well 18 and back toward rotors 32 and stators 34. With reference to FIG. 1A, a portion of wheel well 18 and torque bar 24 is removed to better illustrate heat shield 40 and heat shield segments 42. With reference to FIG. 1B, heat shield 40 is attached to wheel 14 and is concentric with wheel well 18. Individual heat shield segments 42 may be secured in place between wheel well 18 and rotors 32 by respective heat shield carriers 44 fixed to wheel well 18. Air gap 46 is defined annularly between heat shield segments 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield segments 42 and respective heat shield carriers 44 can then be fastened to wheel well 18 by heat shield fasteners 53.

Under the operating conditions (e.g., high temperature) of aircraft wheel braking assembly 10, carbon-carbon composites may be prone to material loss from oxidation of the carbon. For example, various carbon-carbon composite components of aircraft wheel braking assembly 10 may experience both catalytic oxidation and inherent thermal oxidation caused by heating the composite during operation. In various embodiments, composite rotors 32 and stators 34 may be heated to sufficiently high temperatures that may oxidize the carbon surfaces exposed to air. At elevated temperatures, infiltration of air and contaminants may cause internal oxidation and weakening, especially in and around rotor lugs 54 or stator slots 56 securing the friction disks to the respective torque bar 24 and torque take-out assembly 22. Because carbon-carbon composite components of aircraft wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in a reaction-formed porous barrier coating (e.g., a silicon-based barrier coating) applied to the carbon-carbon composite.

Elements identified in severely oxidized regions of carbon-carbon composite brake components include potassium (K) and sodium (Na). These alkali contaminants may come into contact with aircraft brakes as part of cleaning or de-icing materials. Other sources include salt deposits left from seawater or sea spray. These and other contaminants (e.g. Ca, Fe, etc.) can penetrate and leave deposits in pores of carbon-carbon composite aircraft brakes, including the substrate and any reaction-formed porous barrier coating. When such contamination occurs, the rate of carbon loss by oxidation can be increased by one to two orders of magnitude.

In various embodiments, components of aircraft wheel braking assembly 10 may reach operating temperatures in the range from about 100° C. (212° F.) up to about 900° C. (1652° F.), or higher (e.g., 1093° C. (2000° F.) on a wear surface of a brake disk). However, it will be recognized that the oxidation protection systems compositions and methods of the present disclosure may be readily adapted to many parts in this and other braking assemblies, as well as to other carbon-carbon composite structures susceptible to oxidation losses from infiltration of atmospheric oxygen and/or catalytic contaminants.

In various embodiments, a method for limiting an oxidation reaction in a substrate (e.g., a composite structure) may comprise forming an oxidation protection system on the composite structure. Forming the oxidation protection system may comprise forming a first slurry by combining a first pre-slurry composition, comprising a first phosphate glass composition (in the form of a glass frit, powder, or other suitable pulverized form), with a first carrier fluid (such as, for example, water), applying the first slurry to a composite structure, and heating the composite structure to a temperature sufficient to dry the carrier fluid and form an oxidation protection coating on the composite structure, which in various embodiments may be referred to a base layer. The first pre-slurry composition of the first slurry may comprise additives, such as, for example, ammonium hydroxide, ammonium dihydrogen phosphate, nanoplatelets (such as graphene-based and/or boron nitride nanoplatelets), and/or a silica compound, among others, to improve hydrolytic stability and/or to increase the composite structure's resistance to oxidation, thereby tending to reduce mass loss of composite structure. In various embodiments, a slurry (e.g., the first slurry) may comprise acid aluminum phosphates having an aluminum (Al) to phosphoric acid ($H_3PO_4$) molar ratio of 1 to 3 or less, such as an Al:$H_3PO_4$ ratio of between 1 to 2 and 1 to 3, which tends to provide increased hydrolytic stability without substantially increasing composite structure mass loss. In various embodiments, a slurry comprising acid aluminum phosphates having an Al:$H_3PO_4$ molar ratio between 1:2 to 1:3, or 1:2 to 1:2.7, produces an increase in hydrolytic protection and an unexpected reduction in composite structure mass loss.

Figure 2A:
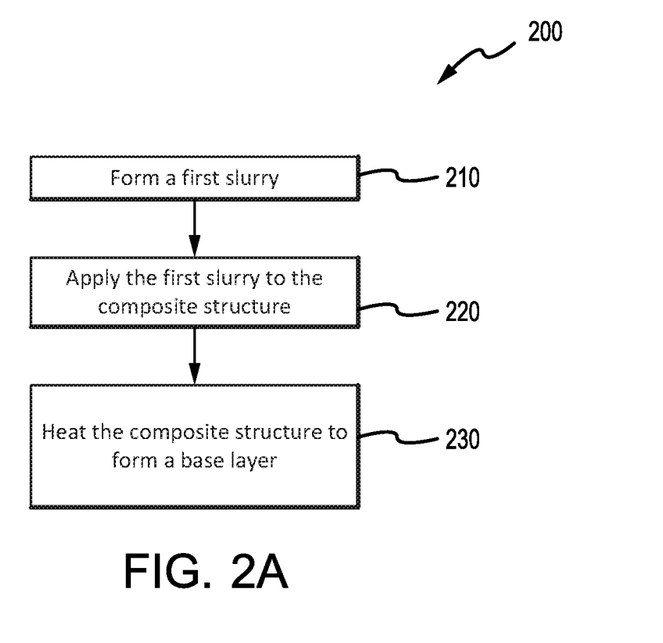
FIGS. 2A, 2B, and 2C illustrate methods for coating a composite structure, in accordance with various embodiments.

With initial reference to FIGS. 1A and 2A, a method 200 for coating a composite structure in accordance with various embodiments is illustrated. Method 200 may, for example, comprise applying an oxidation protection system to non-wearing surfaces of carbon-carbon composite brake components, such as non-wear surfaces 45 and/or rotor lugs 54. Non-wear surface 45, as labeled in FIG. 1A, simply references an exemplary non-wear surface on a brake disk, but non-wear surfaces similar to non-wear surface 45 may be present on any brake disks (e.g., rotors 32, stators 34, pressure plate 36, end plate 38, or the like). In various embodiments, method 200 may be used on the back face of pressure plate 36 and/or end plate 38, an inner diameter (ID) surface of stators 34 including stator slots 56, as well as outer diameter (OD) surfaces of rotors 32 including lugs 54. The oxidation inhibiting composition of method 200 may be applied to preselected regions of a carbon-carbon composite structure that may be otherwise susceptible to oxidation. For example, aircraft brake disks may have the oxidation inhibiting composition applied on or proximate stator slots 56, rotor lugs 54, and/or non-wear surface 45.

In various embodiments, method 200 may comprise forming a first slurry (step 210) by combining a first pre-slurry composition, comprising a first phosphate glass composition in the form of a glass frit, powder, or other suitable pulverized and/or ground form, with a first carrier fluid (such as, for example, water). In various embodiments, the first pre-slurry composition may comprise an acid aluminum phosphate wherein the molar ratio of Al:$H_3PO_4$ may be between 1:2 to 1:3, between 1:2.2 to 1:3, between 1:2.5 to 1:3, between 1:2.7 to 1:3 or between 1:2.9 to 1:3. The first pre-slurry composition of the first slurry may further comprise a boron nitride additive. For example, a boron nitride (such as hexagonal boron nitride) may be added to the first phosphate glass composition such that the resulting first pre-slurry composition comprises between about 10 weight percent and about 25 or 30 weight percent boron nitride, wherein the term "about" in this context only means plus or minus 2 weight percent. Further, the first pre-slurry composition may comprise between about 15 weight percent and 25 weight percent boron nitride, wherein the term "about" in this context only means plus or minus 2 weight percent. Boron nitride may be prepared for addition to the first pre-slurry composition and/or first phosphate glass composition by, for example, ultrasonically exfoliating boron nitride in dimethylformamide (DMF), a solution of DMF and water, and/or 2-propanol solution. In various embodiments, the boron nitride additive may comprise a boron nitride that has been prepared for addition to the first pre-slurry composition and/or first phosphate glass composition by crushing or milling (e.g., ball milling) the boron nitride. The resulting boron nitride may be combined with the first phosphate glass composition glass frit.

In various embodiments, the first pre-slurry composition may further comprise a silica ($SiO_2$) compound. The silica compound may comprise silica and/or any silica former. A silica former may be a compound which may react (e.g., oxidize) to form silica, for example, a silicide (e.g., a metal silicide), silicon, fumed silica, silicon carbide, silicon carbonitride, and/or the like. In various embodiments, the first slurry may comprise between 0.5% and 15% by weight silica compound, between 0.5% and 6% by weight silica compound, and/or between 2% and 5% by weight silica compound. In various embodiments, the first pre-slurry composition may comprise between 5% and 40% by weight silica compound, between 10% and 30% by weight silica compound, between 10% and 20% by weight silica compound, and/or between 25% and 35% by weight silica compound.

The first phosphate glass composition may comprise and/or be combined with one or more alkali metal glass modifiers, one or more glass network modifiers and/or one or more additional glass formers. In various embodiments, boron oxide or a precursor may optionally be combined with the $P_2O_5$ mixture to form a borophosphate glass, which has improved self-healing properties at the operating temperatures typically seen in aircraft braking assemblies. In various embodiments, the phosphate glass and/or borophosphate glass may be characterized by the absence of an oxide of silicon. Further, the ratio of $P_2O_5$ to metal oxide in the fused glass may be in the range from about 0.25 to about 5 by weight.

Potential alkali metal glass modifiers may be selected from oxides of lithium, sodium, potassium, rubidium, cesium, and mixtures thereof. In various embodiments, the glass modifier may be an oxide of lithium, sodium, potassium, or mixtures thereof. These or other glass modifiers may function as fluxing agents. Additional glass formers can include oxides of boron, silicon, sulfur, germanium, arsenic, antimony, and mixtures thereof.

Suitable glass network modifiers include oxides of vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof.

The first phosphate glass composition may be prepared by combining the above ingredients and heating them to a fusion temperature. In various embodiments, depending on the particular combination of elements, the fusion temperature may be in the range from about 700° C. (1292° F.) to about 1500° C. (2732° F.). The resultant melt may then be cooled and pulverized and/or ground to form a glass frit or powder. In various embodiments, the first phosphate glass composition may be annealed to a rigid, friable state prior to being pulverized. Glass transition temperature ($T_g$), glass softening temperature (Ts) and glass melting temperature ($T_m$) may be increased by increasing refinement time and/or temperature. Before fusion, the first phosphate glass composition comprises from about 20 mol % to about 80 mol % of $P_2O_5$. In various embodiments, the first phosphate glass composition comprises from about 30 mol % to about 70 mol % $P_2O_5$, or precursor thereof. In various embodiments, the first phosphate glass composition comprises from about 40 to about 60 mol % of $P_2O_5$. In this context, the term "about" means plus or minus 5 mol %.

The first phosphate glass composition may comprise, or be combined with, from about 5 mol % to about 50 mol % of the alkali metal oxide. In various embodiments, the first phosphate glass composition may comprise, or be combined with, from about 10 mol % to about 40 mol % of the alkali metal oxide. Further, the first phosphate glass composition may comprise, or be combined with, from about 15 to about 30 mol % of the alkali metal oxide or one or more precursors thereof. In various embodiments, the first phosphate glass composition may comprise, or be combined with, from about 0.5 mol % to about 50 mol % of one or more of the above-indicated glass formers. The first phosphate glass composition may comprise, or be combined with, about 5 to about 20 mol % of one or more of the above-indicated glass formers. As used herein, mol % is defined as the number of moles of a constituent per the total moles of the solution.

In various embodiments, the first phosphate glass composition may comprise, or be combined with, from about 0.5 mol % to about 40 mol % of one or more of the above-indicated glass network modifiers. The first phosphate glass composition may comprise, or be combined with, from about 2.0 mol % to about 25 mol % of one or more of the above-indicated glass network modifiers.

In various embodiments, the first phosphate glass composition may represented by the formula:

$$a(A'_2O)_x(P_2O_5)_{y1}b(G_fO)_{y2}c(A''O)_z \qquad [1]$$

In Formula 1, A' is selected from: lithium, sodium, potassium, rubidium, cesium, and mixtures thereof; $G_f$ is selected from: boron, silicon, sulfur, germanium, arsenic, antimony, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; $y_1$ is a number in the range from about 0.100 to about 0.950; $y_2$ is a number in the range from 0 to about 0.20; and z is a number in the range from about 0.01 to about 0.5; $(x+y_1+y_2+z)=1$; and $x<(y_1+y_2)$. The first phosphate glass composition may be formulated to balance the reactivity, durability and flow of the resulting glass base layer for optimal performance. As used in this context, the term "about" means plus or minus ten percent of the respective value.

In various embodiments, first phosphate glass composition in glass frit form may be combined with additional components to form the first pre-slurry composition. For example, crushed first phosphate glass composition in glass frit form may be combined with ammonium hydroxide, ammonium dihydrogen phosphate, nanoplatelets (such as graphene-based nanoplatelets or boron nitride nanoplatelets), aluminum orthophosphate, acid aluminum phosphate (in any of the molar ratios described herein), boron nitride, a silica compound (silica and/or a silica former), and/or other materials and substances. For example, graphene nanoplatelets could be added to the first phosphate glass composition in glass frit form. In various embodiments, the additional components may be combined and preprocessed before combining them with first phosphate glass composition in glass frit form. Other suitable additional components include, for example, surfactants such as, for example, an ethoxylated low-foam wetting agent and flow modifiers, such as, for example, polyvinyl alcohol, polyacrylate, or similar polymers. In various embodiments, other suitable additional components may include additives to enhance impact resistance and/or to toughen the base layer or coating, such as, for example, at least one of whiskers, nanofibers or nanotubes consisting of nitrides, carbides, carbon, graphite, quartz, silicates, aluminosilicates, phosphates, and the like. In various embodiments, additives to enhance impact resistance and/or to toughen the base layer or coating may include silicon carbide whiskers, carbon nanofibers, boron nitride nanotubes and similar materials known to those skilled in the art.

The first slurry may comprise any suitable weight percentage first phosphate glass composition. For example, the first slurry may comprise between 20% and 50% by weight first phosphate glass composition, between 20% and 40% by weight first phosphate glass composition, between 20% and 30% by weight first phosphate glass composition, and/or between 30% and 40% by weight first phosphate glass composition. The first pre-slurry composition (and/or the resulting base layer, discussed in association with step 230) may comprise any suitable weight percentage first phosphate glass composition. For example, the first pre-slurry composition may comprise between 50% and 95% by weight first phosphate glass composition, between 60% and 90% by weight first phosphate glass composition, and/or between 70% and 80% by weight first phosphate glass composition.

In various embodiments, method 200 further comprises applying the first slurry to a composite structure (step 220). Applying the first slurry may comprise, for example, spraying or brushing the first slurry to an outer surface of the composite structure. Any suitable manner of applying the first slurry to the composite structure is within the scope of the present disclosure. As referenced herein, the composite structure may refer to a carbon-carbon composite structure.

In various embodiments, method 200 may further comprise a step 230 of heating the composite structure to form a base layer of phosphate glass. The composite structure may be heated (e.g., dried or baked) at a temperature in the range from about 200° C. (292° F.) to about 1000° C. (1832° F.). In various embodiments, the composite structure is heated to a temperature in a range from about 600° C. (1112° F.) to about 1000° C. (1832° F.), or between about 200° C. (292° F.) to about 900° C. (1652° F.), or further, between about 400° C. (752° F.) to about 850° C. (1562° F.). Step 230 may, for example, comprise heating the composite structure for a period between about 0.5 hour and about 8 hours, wherein the term "about" in this context only means plus or minus 0.25 hours. The base layer may also be referred to as a coating.

In various embodiments, the composite structure may be heated to a first, lower temperature (for example, about 30° C. (86° F.) to about 400° C. (752° F.)) to bake or dry the base layer at a controlled depth. A second, higher temperature (for example, about 300° C. (572° F.) to about 1000° C. (1832° F.)) may then be used to form a deposit from the base layer within the pores of the composite structure. The duration of each heating step can be determined as a fraction of the overall heating time and can range from about 10% to about 50%, wherein the term "about" in this context only means plus or minus 5%. In various embodiments, the duration of the lower temperature heating step(s) can range from about 20% to about 40% of the overall heating time, wherein the term "about" in this context only means plus or minus 5%. The lower temperature step(s) may occupy a larger fraction of the overall heating time, for example, to provide relatively slow heating up to and through the first lower temperature. The exact heating profile will depend on a combination of the first temperature and desired depth of the drying portion.

Step 230 may be performed in an inert environment, such as under a blanket of inert gas or less reactive gas (e.g., nitrogen, argon, other noble gases and the like). For example, a composite structure may be pretreated or warmed prior to application of the first slurry to aid in the penetration of the first slurry. Step 230 may be for a period of about 2 hours at a temperature of about 600° C. (1112° F.) to about 800° C. (1472° F.), wherein the term "about" in this context only means plus or minus 10° C. The composite structure and the first slurry may then be dried or baked in a non-oxidizing, inert or less reactive atmosphere, e.g., noble gasses and/or nitrogen ($N_2$), to optimize the retention of the first pre-slurry composition of the first slurry and resulting base layer in the pores of the composite structure. This retention may, for example, be improved by heating the composite structure to about 200° C. (392° F.) and maintaining the temperature for about 1 hour before heating the carbon-carbon composite to a temperature in the range described above. The temperature rise may be controlled at a rate that removes water without boiling, and provides temperature uniformity throughout the composite structure.

Figure 2B:
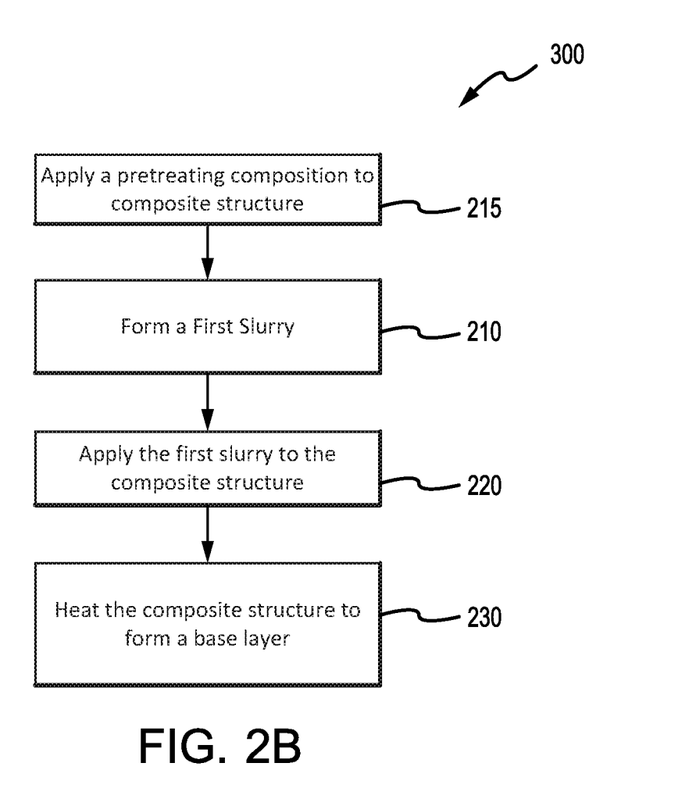

In various embodiments and with reference now to FIG. 2B, method 300, which comprises steps also found in method 200, may further comprise applying a pretreating composition (step 215) prior to applying the first slurry. Step 215 may, for example, comprise applying a first pretreating composition to an outer surface of a composite structure (e.g., a non-wear surface 45, as shown in FIG. 1), such as a component of aircraft wheel braking assembly 10. In various embodiments, the first pretreating composition may comprise an aluminum oxide in water. For example, the aluminum oxide may comprise an additive, such as a nanoparticle dispersion of aluminum oxide (for example, NanoBYK-3600®, sold by BYK Additives & Instruments). The first pretreating composition may further comprise a surfactant or a wetting agent. The composite structure may be porous, allowing the pretreating composition to penetrate at least a portion of the pores of the composite structure.

In various embodiments, after applying the first pretreating composition, the component may be heated to remove water and fix the aluminum oxide in place. For example, the component may be heated between about 100° C. (212° F.) and 200° C. (392° F.), and further, between 100° C. (212° F.) and 150° C. (302° F.).

Step 215 may further comprise applying a second pretreating composition to the composite structure. In various embodiments, the second pretreating composition may comprise a phosphoric acid and an aluminum phosphate, aluminum hydroxide, and/or aluminum oxide. The second pretreating composition may further comprise, for example, a second metal salt such as a magnesium salt. In various embodiments, the aluminum to phosphorus molar ratio of the aluminum phosphate is 1 to 3. Further, the second pretreating composition may also comprise a surfactant or a wetting agent. In various embodiments, the second pretreating composition is applied directly to the composite structure and/or atop the first pretreating composition, if a first pretreating composition is applied. The composite structure may then, for example, be heated. In various embodiments, the composite structure may be heated between about 600° C. (1112° F.) and about 800° C. (1472° F.), and further, between about 650° C. (1202° F.) and 750° C. (1382° F.).

Figure 2C:
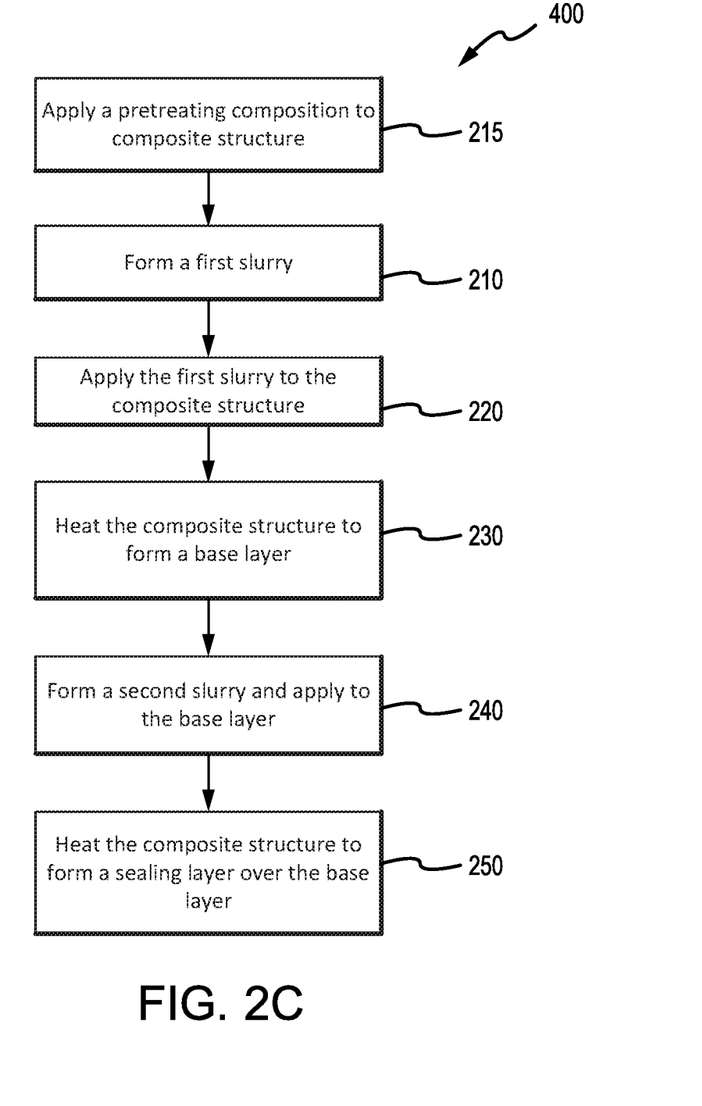

In various embodiments and with reference now to FIG. 2C, method 400 may further comprise a step 240, similar to step 210, of forming a second slurry by combining a second pre-slurry composition, which may comprise a second phosphate glass composition in glass frit or powder form, with a second carrier fluid (such as, for example, water). In various embodiments, the second pre-slurry composition may further comprise ammonium dihydrogen phosphate (ADHP) and/or aluminum orthophosphate. Further, step 240 may comprise spraying or brushing the second slurry of the second phosphate glass composition on to an outer surface of the base layer. Any suitable manner of applying the second slurry to the base layer is within the scope of the present disclosure (e.g., the application methods described in relation to step 220).

In various embodiments, the second pre-slurry composition may further comprise a strengthening compound. The strengthening compound may comprise boron nitride, a metal oxide, and/or silicon carbide. The metal oxide may be any suitable metal oxide. For example, in various embodiments, the metal oxide may comprise aluminum, titanium, silicon, lithium, magnesium, sodium, potassium, and/or the like. In various embodiments, the strengthening compound may comprise a silica ($SiO_2$) compound. The silica compound may comprise silica and/or any silica former. A silica former may be a compound which may react (e.g., oxidize) to form silica, for example, a silicide (e.g., a metal silicide), silicon, fumed silica, silicon carbide, and silicon carbonitride. In various embodiments, the strengthening compound may comprise a molybdenum compound such as molybdenum disulfide ($MoS_2$) and/or molybdenum disilicide ($MoSi_2$). The strengthening compound may comprise any suitable form such as nanoplatelets (e.g., boron nitride or graphene nanoplatelets), whiskers (e.g., silicon carbide whiskers), nanotubes, nanofibers, particles, and/or the like, comprising nitrides, carbides, carbon, graphite, quartz, silicates, aluminosilicates, phosphates, and/or the like. In various embodiments, in which the strengthening compound is comprised of particles, the particle size may be between 10 nanometers (nm) and 300 nm (between $3.9\times10^{-7}$ inch and $1.2\times10^{-5}$ inch), between 10 nm and 200 nm (between $3.9\times10^{-7}$ inch and $7.9\times10^{-6}$ inch), and/or between 100 nm and 200 nm (between $3.9\times10^{-6}$ inch and $7.9\times10^{-6}$ inch).

In various embodiments, the second slurry may comprise between 0.1% and 6% by weight strengthening compound, between 2% and 6% by weight strengthening compound, between 3% and 6% by weight strengthening compound, between 3% and 5% by weight strengthening compound, and/or between 4% and 6% by weight strengthening compound. In various embodiments, the second pre-slurry composition (and/or the resulting sealing layer, discussed in association with step 250) may comprise between 5% and 20% by weight strengthening compound, between 5% and 15% by weight strengthening compound, between 8% and 12% by weight strengthening compound, and/or between 10% and 12% by weight strengthening compound.

Boron nitride may be prepared for addition to the second pre-slurry composition and/or second phosphate glass composition by, for example, ultrasonically exfoliating boron nitride in dimethylformamide (DMF), a solution of DMF and water, and/or 2-propanol solution. In various embodiments, the boron nitride additive may comprise a boron nitride that has been prepared for addition to the second pre-slurry composition and/or second phosphate glass composition by crushing or milling (e.g., ball milling) the boron nitride. The resulting boron nitride may be combined with the second phosphate glass composition glass frit.

In various embodiments, the second pre-slurry composition may comprise any of the components of the pre-slurry compositions described in connection with the first pre-slurry composition and/or first phosphate glass composition. In various embodiments, the second phosphate glass composition may comprise the same composition as that described in relation to the first phosphate glass composition (e.g., represented by formula 1). The second slurry may comprise any suitable weight percentage second phosphate glass composition. For example, the second slurry may comprise between 20% and 50% by weight second phosphate glass composition, between 20% and 40% by weight second phosphate glass composition, between 20% and 30% by weight second phosphate glass composition, and/or between 30% and 40% by weight second phosphate glass composition. The second pre-slurry composition (and/or the resulting sealing layer, discussed in association with step 250) may comprise any suitable weight percentage second phosphate glass composition. For example, the second pre-slurry composition (and/or the resulting sealing layer, discussed in association with step 250) may comprise between 50% and 99% by weight second phosphate glass composition, between 70% and 99% by weight second phosphate glass composition, between 80% and 99% by weight second phosphate glass composition, between 90% and 99% by weight second phosphate glass composition, and/or between 93% and 97% by weight second phosphate glass composition.

In various embodiments, a weight ratio of strengthening compound (e.g., boron nitride) to glass frit in the second pre-slurry composition, second slurry, and/or resulting sealing layer (discussed in relation to step 250 herein) may be any suitable ratio. For example, the weight ratio of strengthening compound to glass frit in the second pre-slurry composition, second slurry, and/or resulting sealing layer may be between 5:100 and 15:100, between 8:100 and 12:100, between 8:100 and 10:100, and/or between 10:100 and 12:100.

In various embodiments, the second pre-slurry composition may comprise the same pre-slurry composition and/or phosphate glass composition used to prepare the first pre-slurry composition and/or the first phosphate glass composition. In various embodiments, the second pre-slurry composition may comprise a different pre-slurry composition and/or phosphate glass composition than the first pre-slurry composition and/or first phosphate glass composition.

In various embodiments, the first slurry and/or the second slurry may comprise an additional metal salt. The cation of the additional metal salt may be multivalent. The metal may be an alkaline earth metal or a transition metal. In various embodiments, the metal may be an alkali metal. The multivalent cation may be derived from a non-metallic element such as boron. The term "metal" is used herein to include multivalent elements such as boron that are technically non-metallic. The metal of the additional metal salt may be an alkaline earth metal such as calcium, magnesium, strontium, barium, or a mixture of two or more thereof. The metal for the additional metal salt may be iron, manganese, tin, zinc, or a mixture of two or more thereof. The anion for the additional metal salt may be an inorganic anion such as a phosphate, halide, sulfate or nitrate, or an organic anion such as acetate. In various embodiments, the additional metal salt may be an alkaline earth metal salt such as an alkaline earth metal phosphate. In various embodiments, the additional metal salt may be a magnesium salt such as magnesium phosphate. In various embodiments, the additional metal salt may be an alkaline earth metal nitrate, an alkaline earth metal halide, an alkaline earth metal sulfate, an alkaline earth metal acetate, or a mixture of two or more thereof. In various embodiments, the additional metal salt may be magnesium nitrate, magnesium halide, magnesium sulfate, or a mixture of two or more thereof. In various embodiments, the additional metal salt may comprise: (i) magnesium phosphate; and (ii) a magnesium nitrate, magnesium halide, magnesium sulfate, or a mixture of two or more thereof.

The additional metal salt may be selected with reference to its compatibility with other ingredients in the first slurry and/or the second slurry. Compatibility may include metal phosphates that do not precipitate, flocculate, agglomerate, react to form undesirable species, or settle out prior to application of the first slurry and/or the second slurry to the carbon-carbon composite. The phosphates may be monobasic ($H_2PO_4^-$), dibasic ($HPO_4^{-2}$), or tribasic ($PO_4^{-3}$). The phosphates may be hydrated. Examples of alkaline earth metal phosphates that may be used include calcium hydrogen phosphate (calcium phosphate, dibasic), calcium phosphate tribasic octahydrate, magnesium hydrogen phosphate (magnesium phosphate, dibasic), magnesium phosphate tribasic octahydrate, strontium hydrogen phosphate (strontium phosphate, dibasic), strontium phosphate tribasic octahydrate and barium phosphate.

In one embodiment, a chemical equivalent of the additional metal salt may be used as the additional metal salt. Chemical equivalents include compounds that yield an equivalent (in this instance, an equivalent of the additional metal salt) in response to an outside stimulus such as, temperature, hydration, or dehydration. For example, equivalents of alkaline earth metal phosphates may include alkaline earth metal pyrophosphates, hypophosphates, hypophosphites and orthophosphites. Equivalent compounds include magnesium and barium pyrophosphate, magnesium and barium orthophosphate, magnesium and barium hypophosphate, magnesium and barium hypophosphite, and magnesium and barium orthophosphite.

While not wishing to be bound by theory, it is believed that the addition of multivalent cations, such as alkaline earth metals, transition metals and nonmetallic elements such as boron, to the first slurry and/or the second slurry enhances the hydrolytic stability of the metal-phosphate network. In general, the hydrolytic stability of the metal-phosphate network increases as the metal content increases, however a change from one metallic element to another may influence oxidation inhibition to a greater extent than a variation in the metal-phosphate ratio. The solubility of the phosphate compounds may be influenced by the nature of the cation associated with the phosphate anion. For example, phosphates incorporating monovalent cations such as sodium orthophosphate or phosphoric acid (hydrogen cations) are very soluble in water while (tri)barium orthophosphate is insoluble. Phosphoric acids can be condensed to form networks but such compounds tend to remain hydrolytically unstable. Generally, it is believed that the multivalent cations link phosphate anions creating a phosphate network with reduced solubility. Another factor that may influence hydrolytic stability is the presence of —P—O—H groups in the condensed phosphate product formed from the first slurry and/or the second slurry during thermal treatment. The first slurry and/or the second slurry may be formulated to minimize concentration of these species and any subsequent hydrolytic instability. Whereas increasing the metal content may enhance the hydrolytic stability of the first slurry and/or the second slurry, it may be desirable to strike a balance between composition stability and effectiveness as an oxidation inhibitor.

In various embodiments, the additional metal salt may be present in the first slurry and/or the second slurry at a concentration in the range from about 0.5 weight percent to about 30 weight percent, and in various embodiments from about 0.5 weight percent to about 25 weight percent, and in various embodiments from about 5 weight percent to about 20 weight percent. In various embodiments, a combination of two or more additional metal salts may be present at a concentration in the range from about 10 weight percent to about 30 weight percent, and in various embodiments from about 12 weight percent to about 20 weight percent.

Method 400 may further comprise a step 250 of heating the composite structure to remove the carrier fluid from the second slurry, forming a sealing layer, which may comprise phosphate glass and/or a strengthening compound. The sealing layer may be formed over and/or adjacent to the base layer. Similar to step 230, the composite structure may be heated at a temperature sufficient to adhere the sealing layer to the base layer by, for example, drying or baking the carbon-carbon composite structure at a temperature in the range from about 200° C. (392° F.) to about 1000° C. (1832° F.). In various embodiments, the composite structure is heated to a temperature in a range from about 600° C. (1112° F.) to about 1000° C. (1832° F.), or between about 200° C. (392° F.) to about 900° C. (1652° F.), or further, between about 400° C. (752° F.) to about 850° C. (1562° F.), wherein in this context only, the term "about" means plus or minus 10° C. Further, step 250 may, for example, comprise heating the composite structure for a period between about 0.5 hour and about 8 hours, where the term "about" in this context only means plus or minus 0.25 hours.

In various embodiments, step 250 may comprise heating the composite structure to a first, lower temperature (for example, about 30° C. (86° F.) to about 300° C. (572° F.)) followed by heating at a second, higher temperature (for example, about 300° C. (572° F.) to about 1000° C. (1832° F.)). Further, step 250 may be performed in an inert environment, such as under a blanket of inert or less reactive gas (e.g., nitrogen, argon, other noble gases, and the like).

In various embodiments, with additional reference to FIG. 1, the silica and/or silica former comprised in the first pre-slurry composition (and the base layer formed therefrom, as discussed in step 230) and/or in the second pre-slurry composition (and the sealing layer formed therefrom, as discussed in step 240), may serve to prevent migration of the oxidation protection system from edges of a non-wear surface proximate and/or adjacent to a wear surface, such as edges 41, 43 of non-wear surface 45 adjacent to wear surface 33. Additionally, the strengthening compound in the second pre-slurry composition (and the sealing layer formed therefrom, as discussed in step 240), may also serve to prevent migration of the oxidation protection systems from edges of a non-wear surface proximate and/or adjacent to a wear surface, such as edges 41, 43 of non-wear surface 45 adjacent to wear surface 33. Edges 41, 43 and wear surface 33, as labeled in FIG. 1A, simply reference exemplary edges and an exemplary wear surface, respectively, on a brake disk, but edges similar to edges 41, 43 and wear surfaces similar to wear surface 33 may be present on any brake disks (e.g., rotors 32, stators 34, pressure plate 36, end plate 38, or the like).

Wear surfaces, such as wear surface 33, of brake disks may reach extremely high temperatures during operation (temperatures in excess of 1093° C. (2000° F.)). At such extreme temperatures of wear surfaces, the oxidation protection systems on non-wear surfaces adjacent to the wear surface (e.g., non-wear surface 45 adjacent to wear surface 33) may experience heating. The oxidation protection system disposed on non-wear surface 45 may increase temperature to a point at which the viscosity decreases and causes beading and/or migration of the oxidation protection system layers proximate edges 41, 43 away from edges 41, 43 and the adjacent wear surfaces (e.g., wear surface 33). Thus, composite material on non-wear surface 45 proximate edges 41, 43 may be vulnerable to oxidation because of such migration. Additionally, the extreme temperatures during the operation of brake disks may cause boron nitride comprised in the base layer to oxidize into boron trioxide ($B_2O_3$). Boron trioxide may also be formed from the glass frit in the borophosphate glass comprised in the first and second phosphate glass compositions. The boron trioxide may evaporate off of the composite structure, decreasing the presence of the oxidation protection system on the composite structure, and causing a greater risk of oxidation of the composite structure.

During operation, the silica compound in the first pre-slurry composition (the base layer) and/or in the second pre-slurry composition (the sealing layer) may prevent, or decrease the risk of, the oxidation protection system migrating from edges of non-wear surfaces adjacent to wear surfaces of composite structures. The silica compound in the first pre-slurry composition (the base layer) and/or in the second pre-slurry composition (the sealing layer) may also prevent, or decrease the risk of, the oxidation protection system losing material because of boron trioxide or boric acid evaporation. In various embodiments, in which the silica compound in the base layer and/or sealing layer is silica, in response to boron nitride in the base layer being oxidized into boron trioxide (and/or the formation of boron trioxide formed as a result of the first and second borophosphate glass compositions), the silica may react with the boron trioxide to form borosilicate glass. In various embodiments, in which the silica compound in the base layer and/or sealing layer is a silica former, in response to temperatures elevating to a sufficient level (e.g., 1700° F. (927° C.) or 1800° F. (982° C.)), boron nitride in the base may be oxidized into boron trioxide, and the silica former may react (e.g., oxidize) to form silica. In response (and/or in response to the formation of boron trioxide from the first and second borophosphate glass compositions), the silica may react with the boron trioxide to form borosilicate glass.

If the system comprising the oxidation protection system will be operating a relatively lower temperatures (e.g., below 1700° F. (927° C.)), the silica compound in the base layer and/or sealing layer may comprise silica because a silica former may not oxidize under such conditions to form the silica to react with the boron trioxide. If the system comprising the oxidation protection system will be operating at relatively higher temperatures (e.g., above 1700° F. (927° C.)), the silica compound in the base layer and/or sealing layer may be a silica former, or a combination of silica and a silica former. In such embodiments, the silica in the base layer and/or sealing layer may react with the boron trioxide formed at relatively lower temperatures to form borosilicate glass, and the silica former in the base layer and/or sealing layer may form silica at elevated temperatures to react with boron trioxide to form borosilicate glass.

Borosilicate glass has a higher viscosity (a working point of about 1160° C. (2120° F.), wherein "about" means plus or minus 100° C. (212° F.), and the working point is the point at which a glass is sufficiently soft for the shaping of the glass) than the other components of first pre-slurry composition and the second pre-slurry composition. The high temperatures experienced by edges 41, 43 in their proximity to wear surface 33 may cause minimal, if any, migration of the base layer, sealing layer, and/or oxidation protection system comprising borosilicate glass (formed by the reaction of the silica and boron trioxide). Therefore, with the oxidation protection system comprising a base layer and/or sealing layer including a silica compound, the composite material proximate edges adjacent to a wear surface (e.g., edges 41, 43 adjacent to wear surface 33) may maintain better protection from oxidation as the borosilicate glass formed by the reaction between silica and boron trioxide mitigates migration of the oxidation protection system. Even further, the presence of the silica compound in the base layer and/or sealing layer mitigates the negative effects of the formed boron trioxide (formed from oxidized boron nitride) evaporating from the composite structure and oxidation protection system by reacting with the boron trioxide to form borosilicate glass.

In various embodiments, the second slurry (and the sealing layer formed therefrom, as discussed in step 240) does not comprise a silica compound in order for the sealing layer to have a lower viscosity, allowing self-healing properties during operation (e.g., the lower viscosity sealing layer may flow at elevated temperatures to fill cracks or holes in the base layer and/or oxidation protection system). At extreme temperatures during operation (e.g., above 1700° F. (927° C.)), the sealing layer viscosity may decrease and cause beading (i.e., the coming together of the less viscous sealing layer into droplets). Though the base layer may comprise a silica compound to increase the viscosity of the base layer, the beading sealing layer may bond to or absorb the base layer, causing the base layer to migrate with the migration of the sealing layer. Thus, composite material on non-wear surface 45 proximate edges 41, 43 may be exposed and/or more susceptible to oxidation. To combat such migration, the second slurry may comprise the strengthening compound, which will increase the viscosity of the sealing layer so there is less, or no, migration of the sealing layer and base layer, but not enough such that the sealing layer will not having self-healing properties during operation of the oxidation protection system.

TABLE 1 illustrates four slurries comprising oxidation protection compositions (e.g., examples of first and second slurries, described herein) prepared in accordance with various embodiments. Each numerical value in TABLE 1 is the number of grams of the particular substance added to the slurry.

TABLE 1

|  | Example | | | |
| --- | --- | --- | --- | --- |
|  | A | B | C | D |
| h-Boron nitride powder | 0 | 4.0 | 8.75 | 8.75 |
| Graphene nanoplatelets | 0 | 0 | 0.15 | 0.15 |

TABLE 1-continued

| | Example | | | |
|---|---|---|---|---|
| | A | B | C | D |
| H$_2$O | 52.4 | 55 | 60 | 60 |
| Surfynol 465 surfactant | 0 | 0.2 | 0.2 | 0.2 |
| Silica | 0 | 0 | 0 | 6.0 |
| Ammonium dihydrogen phosphate (ADHP) | 11.33 | 11.33 | 0 | 0 |
| Glass frit | 34 | 30 | 26.5 | 26.5 |
| Aluminum orthophosphate (o-AlPO$_4$) | 2.27 | 2.27 | 0 | 0 |
| Acid Aluminum Phosphate (AALP) 1:2.5 | 0 | 0 | 5 | 5 |

As illustrated in TABLE 1, oxidation protection system slurries comprising a pre-slurry composition, comprising phosphate glass composition glass frit and various additives such as h-boron nitride, graphene nanoplatelets, acid aluminum phosphate, aluminum orthophosphate, a silica compound, a surfactant, a flow modifier such as, for example, polyvinyl alcohol, polyacrylate or similar polymer, ammonium dihydrogen phosphate, and/or ammonium hydroxide, in a carrier fluid (i.e., water) were prepared. Slurry A may be a suitable second slurry which will serve as a sealing layer after heating (such as during step 250), which is substantially free of a strengthening compound (e.g., boron nitride). In this case, "substantially free" means less than 0.01 percent by weight. Slurry B may be a suitable second slurry comprising a strengthening compound (boron nitride) which will serve as a sealing layer after heating (such as during step 250). Slurry C may be a first slurry without a silica compound, which will form a base layer substantially free of a silica compound after heating, and slurry D may be a first slurry comprising a silica compound (silica), which will form a base layer comprising a silica compound after heating, (such as during step 230). As shown in TABLE 1, slurries C and D comprise acid aluminum phosphate with an aluminum to phosphate molar ratio of 1:2.5.

Figure 3:
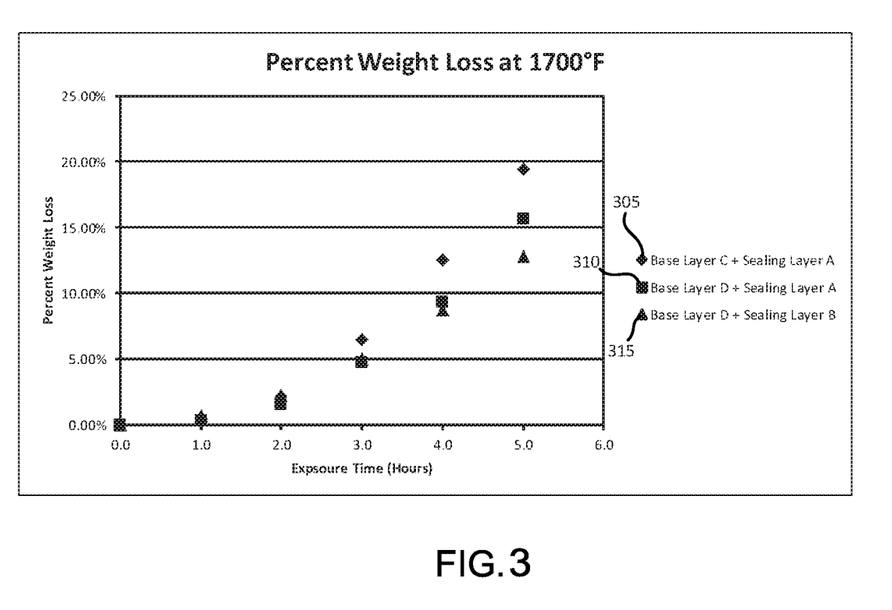
FIG. 3 illustrates experimental data obtained from testing various oxidation protection systems, in accordance with various embodiments.

With combined reference to TABLE 1 and FIG. 3, TABLE 1 and FIG. 3 may allow evaluation of an oxidation protection system comprising a base layer including a silica compound (the silica in slurry D) (data set 310 in comparison to data set 305). Percent weight loss is shown on the y axis and exposure time is shown on the x axis of the graph depicted in FIG. 3. For preparing the oxidation protection system comprising base layer C and sealing layer A, the performance of which is reflected by data set 305, the first slurry, slurry C, was applied to a 50-gram first carbon-carbon composite structure coupon and cured in inert atmosphere under heat at 899° C. (1650° F.) to form a base layer. After cooling, the second slurry, slurry A, was applied atop the cured base layer and the coupons were fired again in an inert atmosphere. For preparing the oxidation protection system comprising base layer D and sealing layer A, the performance of which is reflected by data set 310, slurry D was applied to a 50-gram second carbon-carbon composite structure coupon and cured in an inert atmosphere under heat at 899° C. (1650° F.) to form a base layer. After cooling, the second slurry, slurry A, was applied atop the cured base layer and the coupons were fired again in an inert atmosphere. After cooling, the coupons were subjected to isothermal oxidation testing at 1700° F. (927° C.) over a period of hours while monitoring mass loss.

As can be seen in FIG. 3, the oxidation protection system having the base layer formed from slurry D comprising a silica compound (silica), reflected by data set 310, resulted in significantly less weight loss of the composite structure over a period of five hours than the oxidation protection systems represented by data set 305. These results indicate that the oxidation protection system comprising the silica compound in the base layer (the base layer formed from slurry D in TABLE 1) may be more effective at oxidation protection than an oxidation protection system with a base layer free of a silica compound (data set 305), because the silica compound mitigated migration of the oxidation protection system and reacted with (i.e., neutralized) the boron trioxide formed from boron nitride oxidation to protect against evaporation of the boron trioxide by forming borosilicate in situ.

Additionally, TABLE 1 and FIG. 3 may allow evaluation of an oxidation protection system comprising a base layer (resulting from slurry D) and a sealing layer comprising a strengthening compound (boron nitride) (resulting from slurry B) (data set 315 in comparison to data sets 305 and 310). Percent weight loss is shown on the y axis and exposure time is shown on the x axis of the graph depicted in FIG. 3. For preparing the oxidation protection system comprising base layer D and sealing layer B, the performance of which is reflected by data set 315, the first slurry, slurry D, was applied to a 50-gram first carbon-carbon composite structure coupon and cured in inert atmosphere under heat at 899° C. (1650° F.) to form a base layer. After cooling, the second slurry, slurry B, was applied atop the cured base layer and the coupons were fired again in an inert atmosphere. After cooling, the coupons were subjected to isothermal oxidation testing at 1700° F. (927° C.) over a period of hours while monitoring mass loss.

As can be seen in FIG. 3, the oxidation protection system having the base layer formed from slurry D and the sealing layer formed from slurry B having a strengthening compound (boron nitride), reflected by data set 315, resulted in significantly less weight loss of the composite structure over a period of five hours than the oxidation protection systems represented by data sets 305 and 310. These results indicate that the oxidation protection system comprising the strengthening compound (boron nitride) in the sealing layer (the base layer formed from slurry B in TABLE 1) may be more effective at oxidation protection than an oxidation protection system with a sealing layer free of a strengthening compound (boron nitride) (reflected in data sets 305 and 310). The strengthening compound (boron nitride) in sealing layer B mitigated migration of the base layer and sealing layer at extreme temperatures (1700° F. (927° C.)), while maintaining the self-healing properties of the sealing layer, while sealing layer A, without a strengthening compound, was more prone to migration and causing migration of the base layer.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming an oxidation protection system on a composite structure, comprising:
    forming a first slurry by combining a first pre-slurry composition with a first carrier fluid, wherein the first pre-slurry composition comprises a first phosphate glass composition;
    applying the first slurry to the composite structure;
    heating the composite structure to a temperature sufficient to form a base layer on the composite structure;
    forming a second slurry by combining a second pre-slurry composition with a second carrier fluid, wherein the second pre-slurry composition comprises a second phosphate glass composition and a strengthening compound comprising boron nitride;
    applying the second slurry to the composite structure; and
    heating the composite structure to a temperature sufficient to form a sealing layer on the composite structure.

2. The method of claim 1, wherein the strengthening compound further comprises at least one of a metal oxide or silicon carbide.

3. The method of claim 2, wherein the metal oxide comprises at least one of aluminum oxide, silicon dioxide, and titanium oxide.

4. The method of claim 1, wherein the second slurry comprises between 0.1 and 6 weight percent boron nitride.

5. The method of claim 1, wherein the second slurry comprises between 2 and 5 weight percent boron nitride.

6. The method of claim 1, wherein the second phosphate glass composition comprises a glass frit, and wherein a weight ratio of boron nitride to the glass frit in the second slurry is between 5:100 to 15:100.

7. The method of claim 1, wherein the second phosphate glass composition comprises a glass frit, and wherein a weight ratio of boron nitride to the glass frit in the second slurry is between 10:100 to 12:100.

8. The method of claim 1, wherein the first pre-slurry composition further comprises a silica compound comprising at least one of silica and a silica former.

9. The method of claim 8, wherein the silica former comprises at least one of a metal silicide, silicon, fumed silica, silicon carbide, and silicon carbonitride.

10. The method of claim 1, wherein the first pre-slurry composition of the base layer comprises between about 15 weight percent and about 30 weight percent boron nitride.

11. The method of claim 1, wherein the first pre-slurry composition comprises a first acid aluminum phosphate wherein a first molar ratio of aluminum to phosphate is between 1 to 2 and 1 to 3.

12. The method of claim 1, further comprising applying a pretreating composition, wherein the applying comprises:
    applying a first pretreating composition to an outer surface of the composite structure before the applying the first slurry, wherein the first pretreating composition comprises aluminum oxide and water;
    heating the pretreating composition; and
    applying a second pretreating composition comprising at least one of a phosphoric acid or an acid phosphate salt, and an aluminum salt on the first pretreating composition, wherein the composite structure is porous and the second pretreating composition penetrates at least a portion of a plurality of pores of the composite structure.

13. The method of claim 1, wherein at least one of the first phosphate glass composition or the second phosphate glass composition is represented by the formula A' is selected from: lithium, sodium, potassium, rubidium, cesium, and mixtures thereof;
G$_f$ is selected from: boron, silicon, sulfur, germanium, arsenic, antimony, and mixtures thereof;
A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof;
a is a number in the range from 1 to about 5;
b is a number in the range from 0 to about 10;
c is a number in the range from 0 to about 30;
x is a number in the range from about 0.050 to about 0.500;
$y_1$ is a number in the range from about 0.100 to about 0.950;
$y_2$ is a number in the range from 0 to about 0.20; and
z is a number in the range from about 0.01 to about 0.5;
$(x+y_1+y_2+z)=1$; and
$x<(y_1+y_2)$.

* * * * *